United States Patent [19]

Häfner

[11] Patent Number: 4,522,074
[45] Date of Patent: Jun. 11, 1985

[54] APPARATUS FOR MEASURING SEVERAL FORCE COMPONENTS

[75] Inventor: Hans W. Häfner, Aichach, Fed. Rep. of Germany

[73] Assignee: Pfister GmbH, Fed. Rep. of Germany

[21] Appl. No.: 438,514

[22] Filed: Nov. 1, 1982

[30] Foreign Application Priority Data

Nov. 7, 1981 [DE] Fed. Rep. of Germany ....... 3144358

[51] Int. Cl.³ ............................ G01L 5/16; G01M 9/00
[52] U.S. Cl. ...................................... 73/862.04; 73/147
[58] Field of Search .............................. 73/862.04, 147

[56] References Cited

U.S. PATENT DOCUMENTS

| 3,583,815 | 6/1971 | Kersey | 73/147 X |
| 3,613,443 | 10/1971 | Curry | 73/862.04 X |
| 3,866,467 | 2/1975 | Horanoff | 73/147 |
| 4,073,188 | 2/1978 | Slezinger et al. | 73/147 |
| 4,107,986 | 8/1978 | Jones | 73/862.04 X |
| 4,112,752 | 9/1978 | Hafner et al. | 73/147 |

FOREIGN PATENT DOCUMENTS 2624647 12/1977 Fed. Rep. of Germany.

Primary Examiner—James L. Rowland
Assistant Examiner—Brian R. Tumm
Attorney, Agent, or Firm—Hill, Van Santen, Steadman & Simpson

[57] ABSTRACT

An apparatus for measuring a plurality of force components such as those based on forces of a flowing medium which act on an object of measurement including an object carrier including a sphere supported in mobile fashion about pivotal rotational horizontal and vertical axes including at least one force measuring device connected to the carrier for movement about each of the horizontal and vertical axes with the object carrier including a cylinder guided in a frictionless bearing system about the vertical and rotational axis, a rotary drive for the cylinder with a device for measuring the angle of rotation of the cylinder, a box-like upper end containing the spherical object carrier supported in hydrostatic bearings in a box-like portion with moment arms and pick-ups between the sphere and the box-like portion.

10 Claims, 2 Drawing Figures

APPARATUS FOR MEASURING SEVERAL FORCE COMPONENTS

BACKGROUND OF THE INVENTION

The invention relates to improvements in apparatus for measuring a plurality of force components, and particularly such force components which are based on forces of a flowing medium which act on an object of measurement. The object of measurement is supported on an object carrier which is mounted in a frictionless bearing system, the object carrier being guided in a pivotally rotationally horizontal and vertically mobile fashion and being held in each of these directions by at least one force measuring device.

From U.S. Pat. No. 4,112,752, an apparatus for measuring several force components is known which uses a bearing system for the object carrier consisting of three guide arrangements. Between these three guide arrangements, hydrostatic bearings are provided which permit a movement of the object carrier in all directions. Since the object carrier and the guide arrangements are supported by force measuring devices, all force components of the forces acting on the object of measurement can be detected and ascertained.

An object of the present invention consists in both improving such an apparatus for the measurement of several force components with respect to the measuring accuracy as well as in simplifying the apparatus with respect to the structural arrangement.

This object is achieved in that the support for the object carrier is constructed in the form of a cylinder which is hydrostatically guided in a bearing system about the vertical or Z-axis so as to be rotationally and longitudinally mobile. The cylinder is connected to a rotary drive as well as a rotational angle measuring device. With this arrangement is provided a high degree of measuring accuracy and a particularly compact construction of the measuring apparatus is accomplished which in addition is more simple and less expensive than the construction of apparatus heretofore available provided for the measurement of several force components.

In accordance with a feature of the invention, a rotary drive is provided for a cylinder support which is connected via a torque arm with a force measuring device. This arrangement permits measurement of forces of moments acting on the torque arm which can be measured particularly accurately.

A further object of the invention is to provide an improved overall structural arrangement for a force measuring device which is capable of measuring forces in all directions acting on a carrier for a device which is subject to bearing fluid forces such as that used for measurement of structures in wind tunnels such as aircraft models, components thereof, motor vehicles, building constructions and the like.

Other objects and advantages, and equivalent structures which are intended to be covered herein will become more apparent with the teaching of the principles of the present invention in the disclosure of the preferred embodiment in the specification, claims and drawings in which:

DESCRIPTION OF THE PREFERRED EMBODIMENT

Figure 1:
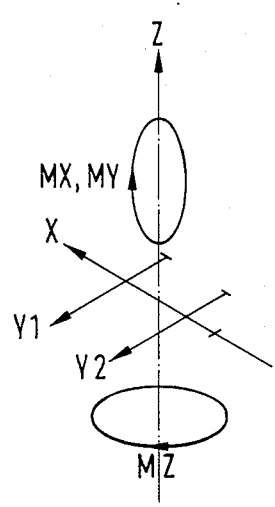
FIG. 1 is a vertical sectional view taken through an apparatus for measuring force components in different directions.
Figure 2:
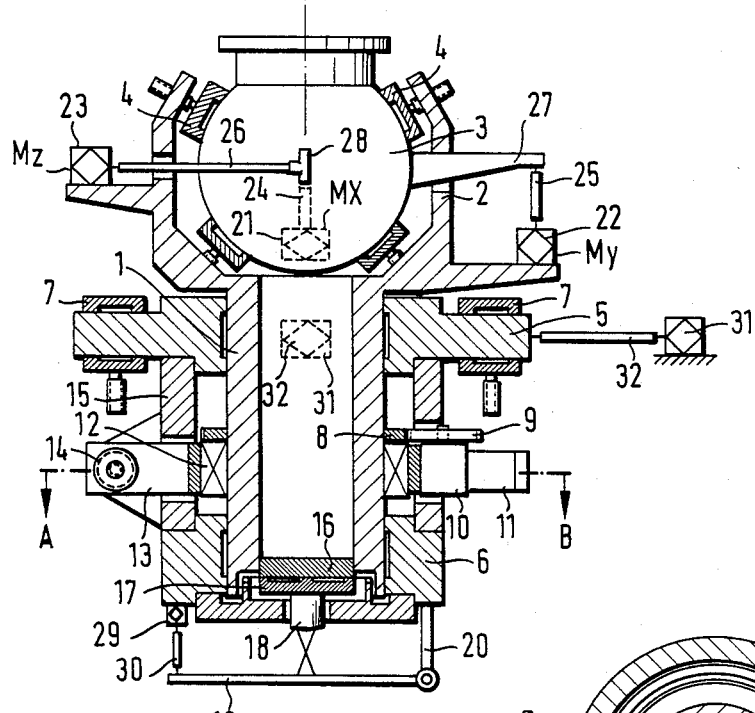
FIG. 2 is a horizontal sectional view taken substantially along line A-B of FIG. 1.
Figure 2:
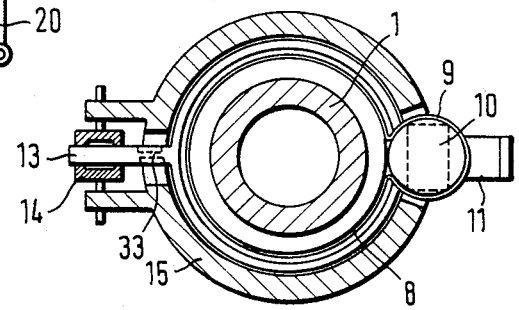

As illustrated in FIGS. 1 and 2, the structure for measuring force components includes a vertical cylinder 1 which has at its upper end an integral box-shaped housing 2 in which a spherically shaped object carrier 3 is mounted within frictionless bearings shown as hydrostatic bearings 4. The hydrostatic bearings support the spherical carrier 3 for free movement in a rotational and pivotally mobile fashion, that is, movement in all directions about its center.

The vertical cylinder 1 is also supported in frictionless bearings shown as hydrostatic in form carried in a support including a upper support part 5 and lower support part 6 with the bearings permitting free rotational movement about the vertical or Z-axis, and also permitting movement longitudinally parallel to the vertical axis.

The support part 5 is itself supported for free movement in a horizontal direction in frictionless hydrostatic bearings 7.

On the cylinder 1 is an arrangement for driving it in rotation about its vertical axis which include drive elements 8, 9, 10 and 11.

A ring gear 8 is driven by a pinion 9 driven by a motor drive 10 and 11.

The rotary drive is carried on a torque arm 13 which is related to the cylinder 1 by having a circular bearing 12 between the torque arm and cylinder. This permits driving the cylinder in rotation relative to the torque arm. The torque arm is guided in a hydrostatic bearing 14 which is externally arranged on a cylindrical housing 15, the housing 15 extending between the upper support part 5 and lower support part 6.

At the lower end, the guide cylinder 1 is closed off by a closing cover 16 which is supported on hydrostatic bearing 17 which has an extension 18 supported on a transverse carrier 19. At the right end of the transverse carrier 19 is a pivotally connected bar 20 which is supported on the lower support 6.

In order to be able to detect and measure the force components or moments MX, MY, and MZ, with reference to the diagrammatic showings at the top of FIG. 1, in a reaction free fashion, pick-ups 21, 22 and 23 are arranged on the upper box-like support 2. The force components or moments act on an object of measurement which is supported on the carrier 3. The pick-ups 21, 22 and 23 are operatively connected to the object carrier 3 by force transmission elements 24, 25, and 26, which connect to moment arms 27 and 28 on the spherical carrier 3. With the aid of the pick-ups 21, 22 and 23, the moments MX and MY about the vertical axis and the moment MZ about the horizontal axis, can advantageously be precisely detected and ascertained. As pick-ups for this purpose, it is possible to employ electromechanical resistance strain gauge force sensors acting in response to stress or strain, or piezoelectric compressive force sensors which will be recognized by those versed in the art.

In order to be able also to detect accurately or measure the forces acting in the vertical direction on the object of measurement and hence on the object carrier 3, a vertical pick-up 29 is provided via a connection element 30 which acts with the transverse carrier 19, extension 18, the bearing 17 and cover 16 all operative in coaction with the vertical guide cylinder 1.

Since the torque arm 13 which is connected to the guide cylinder 1 through the rotary drive, is guided in the hydrostatic bearing 14 extending parallel to the vertical or Z-axis in a frictionless fashion, with the air of the pick-up 29 the forces acting on the object of measurement in a vertical direction can be accurately measured. The pick-up 29 can also be constructed to be provided beneath the extension 18, if desired, to eliminate the connection elements, such as the arm 19.

For measurement of forces acting on the object of measurement in a horizontal direction, at least two pick-ups 31 are provided which via the connection elements 32 engage on the pivot bearing 5, and are preferably offset relative to one another by an angle of 90°. Thus, the forces X, Y1, Y2 and Z are determined by the pick-ups 31 and 29.

In addition, with the aid of the rotary drive including the elements 8, 9, 10 and 11, a guide cylinder 1 can be randomly rotated about the vertical Z-axis.

In order to also be able to detect and measure the forces acting on the object of measurement, which forces are transmitted to the guide cylinder 1 and act in the rotational direction about the vertical Z-axis, a rotational angle measuring device, not further illustrated but contained at 14, is advantageously integrated into the drive. For measurement of rotational forces about a vertical axis transmitted from the object of measurement to the carrier 3 and then via the guide cylinder 1 and the rotary drive 11 to the torque arm 13, a force measuring device 33 is provided as illustrated in FIG. 2, integrated in the torque arm 13.

The measuring apparatus shown and described primarily serves for ascertaining fluid flow forces, such as for example, act on an object of measurement tested in a wind tunnel. Such devices may include an aircraft model, a component of aviation or a space flight, or a model of motor vehicles, building constructions or parts thereof.

The measuring apparatus according to the invention renders possible a very accurate particularly reaction-free measurement of all forces acting on the object of measurement. The structure is in addition very compact and space saving, and operates to attain the objectives and features above set forth. Various readouts for the force measuring devices may be employed for visually and manually recording the forces, or the devices may be connected to an automatic control mechanism or to a computer input for recording purposes or for controlling automatic mechanisms which require an input of fluid forces acting on the supported object.

I claim as my invention:

1. An apparatus for measuring a plurality of force components such as those based on forces of a flowing medium which act on an object of measurement comprising in combination:
   an object carrier;
   frictionless bearings;
   a cylinder supporting, in said frictionless bearings, the object carrier in a mobile fashion about pivotal, rotational, horizontal and vertical axes;
   a support means guiding said cylinder about the vertical axis for rotational and longitudinal movement;
   force measuring devices for the force components to be measured, said force measuring devices connected to the object carrier and connected to and carried by the cylinder; and
   a rotary drive connected to said cylinder for setting the object carrier, by rotating the cylinder, into a desired angular position in respect of the support means;
   whereby the object of measurement maintains its position relative to the force measuring devices.

2. An apparatus in accordance with claim 1, wherein:
   said frictionless bearings comprise hydrostatic bearings,
   said apparatus further comprises additional hydrostatic bearings, the cylinder being frictionlessly guided in the support means by said additional hydrostatic bearings.

3. An apparatus in accordance with claim 1, wherein:
   a torque arm supports said rotary drive at the cylinder; and
   a further force measuring device is connected between said torque arm and said support means.

4. An apparatus in accordance with claim 3, wherein:
   a further hydrostatic bearing guides said torque arm for vertical movement.

5. An apparatus in accordance with claim 1, wherein:
   said cylinder comprises, at its upper end, a box-shaped housing containing said object carrier, said object carrier being spherical in shape and mounted in said box-shaped housing in said frictionless bearings for rotation and pivotal movement.

6. An apparatus in accordance with claim 5, wherein:
   said frictionless bearings are hydrostatic bearings.

7. An apparatus in accordance with claim 5, wherein:
   said object carrier comprises moment arms acting against rotational movement about the vertical axis and two horizontal axes perpendicular to each other, said moment arms connected to said force measuring devices which are connected to and carried by said box-shaped housing.

8. An apparatus in accordance with claim 1, and further comprising:
   means for measuring the angular position of the cylinder relative to the support means connected to said rotary drive.

9. An apparatus for measuring a plurality of force components such as those based on forces of a flowing medium which act on an object of measurement comprising in combination:
   a spherical shaped object carrier;
   a cylinder vertically supported by hydrostatic bearings for movement in a rotational direction and a vertical direction and having a box-shaped carrier for said object carrier at its upper end;
   frictionless hydrostatic bearings between said box-shaped carrier and the object carrier;
   moment arms connected between the spherical object carrier and the box-shaped carrier having force measuring pick-ups;
   a horizontal support for the cylinder permitting free rotation about a vertical axis;
   torque arm means connected between the support and the cylinder, including a rotary drive for said cylinder and an angle of rotation measuring device; and
   a force measuring means connected between the cylinder and said horizontal support.

10. An apparatus for measuring a plurality of force components such as those based on forces of a flowing medium which act on an object of measurement constructed in accordance with claim 9:
   wherein said force measuring means includes first and second force measuring pick-ups connected between the horizontal support and the cylinder and angularly displaced from each other.

* * * * *